United States Patent
Ciciriello et al.

(10) Patent No.: US 10,547,258 B2
(45) Date of Patent: Jan. 28, 2020

(54) VIBRATION CONTROL METHOD AND SYSTEM

(71) Applicants: ROLLS-ROYCE PLC, London (GB); ROLLS-ROYCE DEUTSCHLAND LTD & CO KG, Blankenfelde-Mahlow, Dahlewitz (DE)

(72) Inventors: Lucia Ciciriello, Berlin (DE); Kevin Smith, Derby (GB)

(73) Assignees: ROLLS-ROYCE plc, London (GB); ROLLS-ROYCE DEUTSCHLAND LTD & CO KG, Dahlewitz (DE)

( * ) Notice: Subject to any disclaimer, the term of this patent is extended or adjusted under 35 U.S.C. 154(b) by 0 days.

(21) Appl. No.: 16/175,938

(22) Filed: Oct. 31, 2018

(65) Prior Publication Data
US 2019/0131902 A1 May 2, 2019

(30) Foreign Application Priority Data
Nov. 1, 2017 (GB) .................................. 1718068.8

(51) Int. Cl.
*H02P 9/10* (2006.01)
*H02P 23/04* (2006.01)
(Continued)

(52) U.S. Cl.
CPC ............. *H02P 9/105* (2013.01); *B64D 41/00* (2013.01); *F01D 15/10* (2013.01); *F01D 25/164* (2013.01); *F02C 6/00* (2013.01); *F04D 29/059* (2013.01); *F16C 17/02* (2013.01); *F16C 17/024* (2013.01); *F16C 17/026* (2013.01);
(Continued)

(58) Field of Classification Search
USPC ............................................. 322/19; 290/1 A
See application file for complete search history.

(56) References Cited

U.S. PATENT DOCUMENTS 5,347,190 A * 9/1994 Lewis ................. F16C 32/0442
310/68 B
5,994,813 A * 11/1999 Umeda ................... H02K 1/165
29/596

(Continued)

OTHER PUBLICATIONS

Feb. 18, 2019 Extended Search Report issued in European Patent Application No. 18203281.3.
(Continued)

*Primary Examiner* — Pedro J Cuevas
(74) *Attorney, Agent, or Firm* — Oliff PLC

(57) ABSTRACT

An electric machine coupled to rotating machinery includes a rotor and a stator, and the method of control of an electric machine and an electric machine control system. The method includes sensing one or more parameters indicative of one or more resonance conditions of the rotating machinery, and comparing the sensed parameter to a predetermined threshold to determine whether the rotating machinery is operating at the resonance condition. Where the rotating machinery is determined to be operating at the resonance condition, adjusting a magnetic field of one or both of the rotor and the stator to provide a predetermined torque to the rotating machine, to modulate the stiffness of the rotational machinery, and thereby move the resonance condition away from the current rotating machinery conditions.

15 Claims, 12 Drawing Sheets

(51) Int. Cl.

| | | |
|---|---|---|
| *F01D 15/10* | (2006.01) | |
| *H02P 101/25* | (2016.01) | |
| *F16C 32/06* | (2006.01) | |
| *F16C 19/00* | (2006.01) | |
| *F16C 32/04* | (2006.01) | |
| *F16C 17/02* | (2006.01) | |
| *F16C 19/52* | (2006.01) | |
| *F16C 17/03* | (2006.01) | |
| *B64D 41/00* | (2006.01) | |
| *F02C 6/00* | (2006.01) | |
| *F01D 25/16* | (2006.01) | |
| *F04D 29/059* | (2006.01) | |
| *F16C 41/00* | (2006.01) | |
| *F16C 19/06* | (2006.01) | |

(52) U.S. Cl.
CPC ............ *F16C 17/028* (2013.01); *F16C 17/03* (2013.01); *F16C 19/00* (2013.01); *F16C 19/527* (2013.01); *F16C 32/0442* (2013.01); *F16C 32/0444* (2013.01); *F16C 32/0446* (2013.01); *F16C 32/0476* (2013.01); *F16C 32/0489* (2013.01); *F16C 32/0614* (2013.01); *F16C 41/004* (2013.01); *H02P 23/04* (2013.01); *F05D 2220/323* (2013.01); *F05D 2220/76* (2013.01); *F05D 2240/51* (2013.01); *F05D 2270/333* (2013.01); *F16C 19/06* (2013.01); *F16C 2233/00* (2013.01); *F16C 2360/23* (2013.01); *F16C 2380/27* (2013.01); *H02P 2101/25* (2015.01)

(56) References Cited

U.S. PATENT DOCUMENTS

| | | | | |
|---|---|---|---|---|
| 6,014,003 A * | 1/2000 | French | ................ | H02P 25/0925 318/701 |
| 6,051,942 A * | 4/2000 | French | ..................... | H02P 9/40 318/254.1 |
| 6,194,805 B1 * | 2/2001 | Heese | .................... | H02K 19/06 310/166 |
| 6,577,664 B1 | 6/2003 | Nara et al. | | |
| 8,011,183 B2 * | 9/2011 | Berchowitz | ............. | F02G 1/043 290/1 A |
| 8,066,481 B2 * | 11/2011 | Bannon | ................... | F01D 5/027 416/51 |
| 8,829,701 B2 * | 9/2014 | Ficklscherer | ............ | F02C 9/00 290/52 |
| 9,059,613 B2 * | 6/2015 | Rigosu, Jr. | ................ | H02K 3/16 |
| 9,404,556 B2 * | 8/2016 | Swann | ..................... | F16F 15/18 |
| 9,692,261 B2 * | 6/2017 | Nemoto | ................. | H02K 21/14 |
| 10,122,232 B2 * | 11/2018 | Sakuma | ................... | H02K 3/28 |
| 10,404,155 B2 * | 9/2019 | Al-Hokayem | .......... | H02P 23/14 |
| 2004/0022653 A1 | 2/2004 | Brunet et al. | | |
| 2007/0170788 A1 * | 7/2007 | Werner | ................... | F16F 15/00 310/51 |
| 2009/0015012 A1 | 1/2009 | Metzler et al. | | |
| 2009/0039655 A1 * | 2/2009 | Berchowitz | ............. | F02G 1/043 290/1 A |
| 2010/0266404 A1 * | 10/2010 | Bannon | ................... | F01D 5/027 416/1 |
| 2013/0221797 A1 * | 8/2013 | Rigosu, Jr. | ................ | H02K 3/16 310/261.1 |
| 2014/0103884 A1 * | 4/2014 | Ficklscherer | ............ | F02C 9/00 322/19 |
| 2014/0265730 A1 * | 9/2014 | Swann | ..................... | F16F 15/18 310/326 |
| 2015/0117803 A1 | 4/2015 | Haile et al. | | |
| 2015/0167687 A1 | 6/2015 | Kurihara et al. | | |
| 2015/0251649 A1 | 9/2015 | Liang et al. | | |
| 2015/0295455 A1 * | 10/2015 | Nemoto | ................. | H02K 21/14 310/216.094 |
| 2016/0285336 A1 * | 9/2016 | Sakuma | ................... | H02K 3/28 |
| 2017/0170763 A1 | 6/2017 | Blackwelder et al. | | |
| 2018/0306241 A1 * | 10/2018 | Ciciriello | .............. | F16C 35/073 |
| 2019/0128324 A1 * | 5/2019 | Ciciriello | ................ | H02P 23/04 |
| 2019/0267855 A1 * | 8/2019 | Sakuma | ................... | H02K 1/278 |
| 2019/0273446 A1 * | 9/2019 | Besselmann | .......... | H02M 7/525 |

OTHER PUBLICATIONS

Feb. 19, 2019 Extended Search Report issued in European Patent Application No. 18203500.6.
May 1, 2018 Search Report issued in British Patent Application No. 1718068.8.
U.S. Appl. No. 16/173,145, filed Oct. 29, 2018 in the name of Lucia Ciciriello et al.

* cited by examiner

VIBRATION CONTROL METHOD AND SYSTEM

The present disclosure concerns a method of controlling vibration in a rotating shaft assembly comprising one or more electrical machine, such as a hybrid aircraft propulsion system, as well as a control system, and an aircraft comprising the control system.

A common problem in the field of rotating machinery is controlling the level of vibration. Vibration may be caused by imbalances of the shaft and supported rotatable elements, such as compressor and turbine discs and blades in gas turbine engines, and also external forcing such as aircraft manoeuvres and aerodynamic forces in aircraft. Damping systems such as fluid dampers are commonly employed to reduce vibrations. Vibrations are particularly pronounced at particular rotational speeds/frequencies, known as "critical" speeds, in view of resonances of the rotating system.

At the critical speeds the system vibrates in resonance, a condition at which vibrations are sustained by the system internal vibratory response determined by the designed stiffness, inertia and damping, and may exceed the capability of the damping system, therefore causing damage to components. The damping system may also have a relatively high weight, and may be prone to failure. It should be noted that damping systems reduce the effects of the resonances without eliminating the cause, which is due to the coincidence between external forces and system internal vibratory response frequency. It should also be noted that at given unbalance and external forcing levels, the vibrations in resonance are determined by the stiffness to inertia distribution of the whole arrangement.

Typically, there are several types and modes of vibration. One particular type of vibration that is difficult to deal with is torsional vibration, where the oscillatory movement comprises twisting of one or more rotating components about its rotational axis. It must be noticed that complex engine drivelines, when geared connections are interposed between shafts and or particularly flexible connection elements are used in order to compensate misalignments, the natural frequencies that are predominantly torsional oscillations often generate high axial vibrations. This combined torsional and axial resonance vibration can be detrimental for engine components, particularly for gears and couplings.

In many fields, for example, aerospace, weight is an important consideration. Consequently, large damping systems often cannot be employed. As a partial solution, "keep-out zones" to allow only a fast transit of the critical speeds are employed. Keep-out zones are shaft rotational speeds that are restricted from use, to prevent damage from occurring due to high vibrational forces as a result of system resonances. These keep-out zones can restrict operation of the aircraft. It should also be noted the vibration in resonance may be very detrimental for rotating coupling, bending and gear trains.

According to a first aspect there is provided a method of control of an electric machine coupled to rotating machinery, the electric machine comprising a rotor and a stator, wherein the method comprises:
sensing one or more parameters indicative of one or more resonance conditions of the rotating machinery;
comparing the sensed parameter to a predetermined threshold to determine whether the rotating machinery is operating at the resonance condition; and where the rotating machinery is determined to be operating at the resonance condition, adjusting a magnetic field of one or both of the rotor and the stator to provide a predetermined torque to the rotating machine, to modulate the stiffness of the rotational machinery, and thereby move the resonance condition away from the current rotating machinery conditions.

Advantageously, by operating the electrical machine according to the above method, the resonant condition (e.g. one or more critical speed) is moved away from the current rotating machinery conditions (e.g. the current rotational speed), thereby allowing for operation of the rotating machinery at a wider range of operating speeds, while reducing vibration of the electric machine.

The sensed parameter may comprise one or more of rotating machinery rotational speed, rotational machinery temperature, rotational machinery vibrational modes, rotational machinery vibrational frequency, and rotational machinery vibrational magnitude.

Where the sensed parameter comprises the rotating machinery rotational speed, the resonance condition may comprise a predetermined rotating machinery critical speed.

The magnetic field of one or both of the rotor and the stator may be modulated by cyclically increasing and reducing the torque applied by the electric machine within a predetermined speed band to adjust the stiffness of the system, such that rotating machinery is no longer operated at the resonance condition. Advantageously, the speed of the rotating machine is not significantly altered. Consequently, the rotating machinery can operate within the critical speed range, without experiencing excessive vibration.

Where the electric machine comprises a motor, the method may comprise modulating the electric current supplied to one or more machine windings to modulate the electric machine torque. Advantageously, the rotational stiffness of the rotating machinery can be controlled independently of acceleration and deceleration, by rapidly accelerating and decelerating the motor rotor.

Where the electric machine comprises a generator, the method may comprise modulating the electrical load on one or more machine windings to modulate the electric machine torque.

The electrical machine may comprise one or more of a permanent magnet synchronous machine, a wound field machine, a brushed DC machine, and an induction machine.

The method may comprise using one or more of proportional, integral and derivative control to control the magnetic field of the electric machine. The inventors have found that proportional control may be used to control rotor damping, while integrative control may be used to control stiffness, and derivative control may be used to control machine inertia. Consequently, the critical speed can be accurately controlled as desired using conventional, well understood control systems.

The method may comprise modulating one or more of proportional, integral and derivative gain values to adjust one or more of the stiffness, inertia, and damping of the electric machine. For example, the method may comprise setting one or more of a proportional, integral and derivative gain to a predetermined value where the current and critical rotational speeds coincide.

The one or more predetermined gain value may be determined in accordance with one or more of model based control, closed loop control, and open loop control.

The closed loop control may comprise determining the one or more gain value on the basis of the sensed parameter of the rotating machinery.

The method may comprise setting one or more of a predetermined target torque oscillation frequency, torque magnitude and speed range at a corresponding sensed parameter, and controlling the electrical machine torque in accordance with the predetermined target torque oscillation frequency, torque magnitude and/or speed range at the corresponding sensed parameter.

According to a second aspect, there is provided a system comprising rotating machinery and an electric machine coupled to the rotating machinery, the electric machine comprising a rotor and a stator, the system further comprising a controller adapted to control the electric machine in accordance with the method of the first aspect.

The system may comprise an aircraft propulsor. The rotating machinery may comprise one or more engine shafts and one or more propulsive fans or propellers.

According to a third aspect, there is provided an aircraft propulsive system comprising a system in accordance with the second aspect.

The aircraft propulsive system may comprise a gas turbine engine. The gas turbine engine may comprise at least one compressor and at least one turbine interconnected by a main engine shaft, wherein the electric machine is coupled to the main engine shaft.

The gas turbine engine may comprise a planetary reduction gearbox, which interconnects a fan drive turbine and a fan via respective input and output shafts. The reduction gearbox may comprise a planetary gearbox comprising a sun gear, multiple planet gears, a planet carrier and a ring gear, each supported by respective shafts. The shaft of the bearing arrangement may comprise one or more of the sun shaft, the planet carrier shaft, the ring gear shaft and one or more planet shafts.

The engine may comprise an accessory gearbox coupled to one or more of the main shafts via an accessory shaft, and configured to drive one or more engine accessories. The electric machine may comprise a motor and/or a generator coupled to the accessory gearbox.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

Embodiments will now be described by way of example only, with reference to the Figures, in which.

Figure 1:
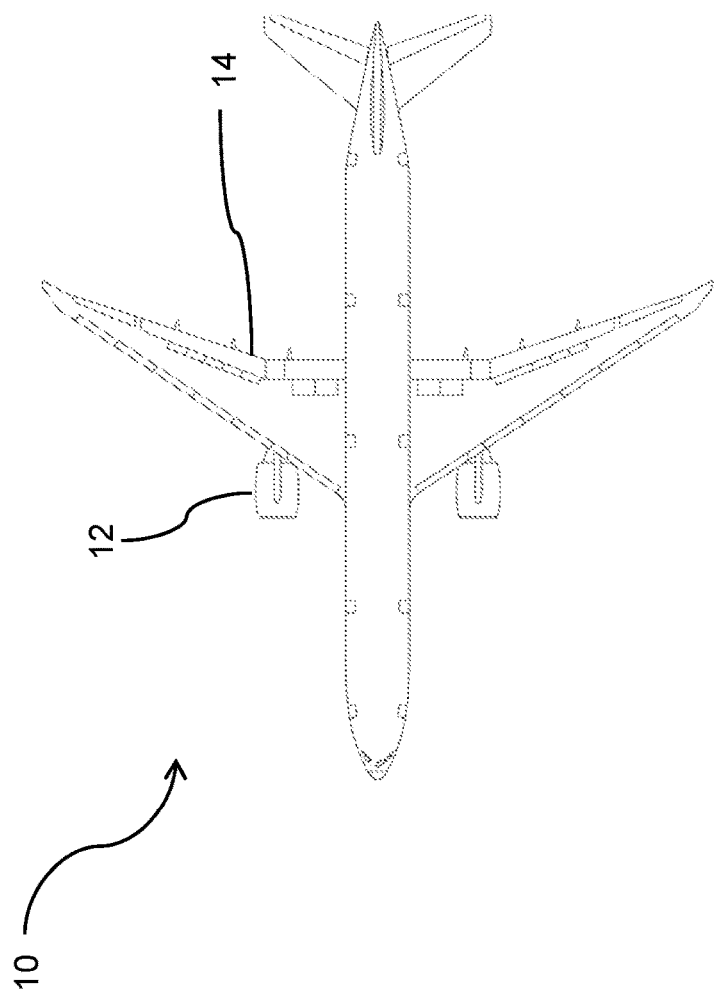
FIG. 1 is a schematic top view of an aircraft having a propulsive system.

With reference to FIG. 1, an aircraft 10 is shown. The aircraft 10 comprises a pair of propulsors 12 mounted to respective wings 14.

Figure 2:
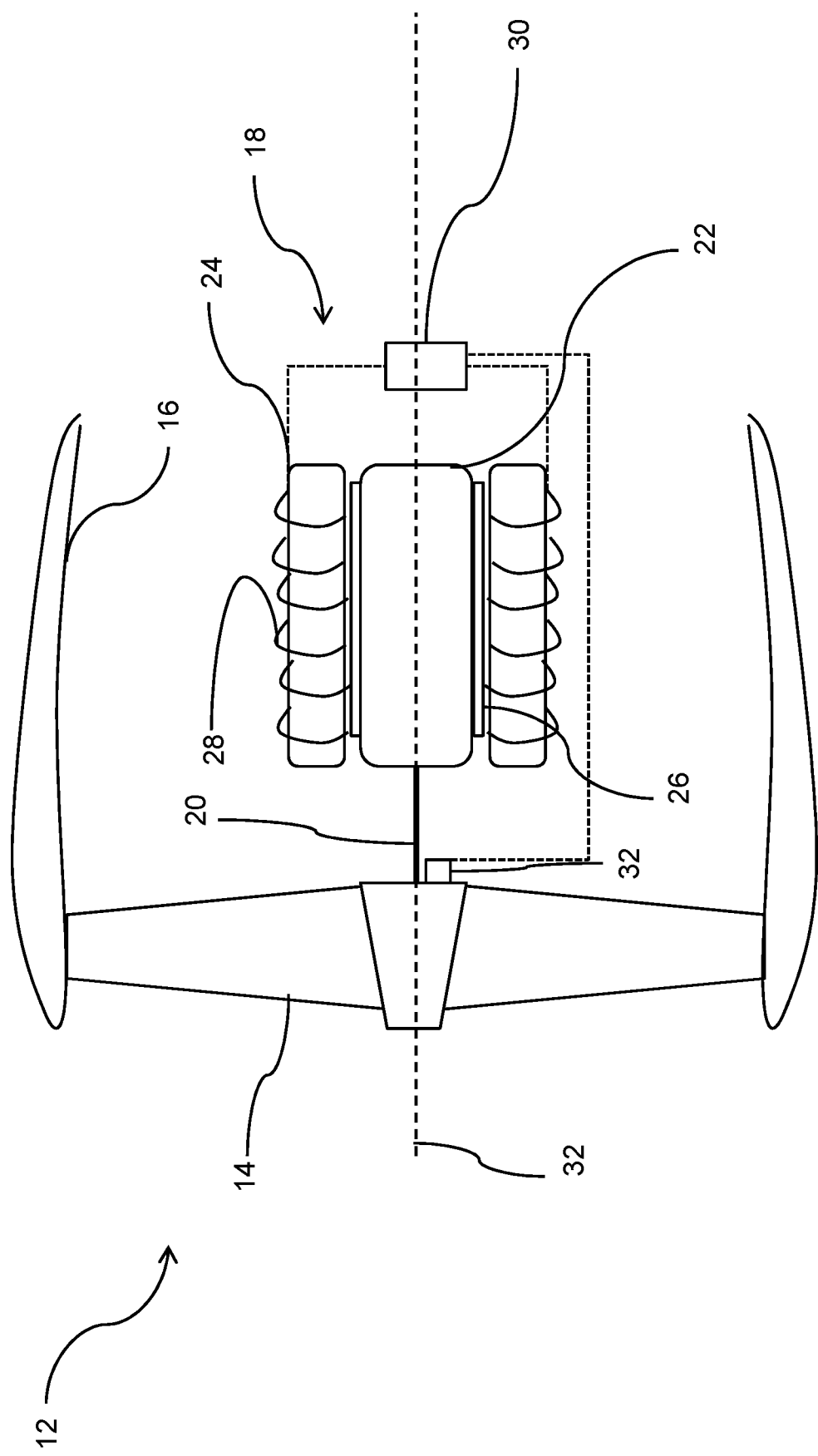
FIG. 2 is a sectional front view of a propulsor for use with the aircraft of FIG. 1.

Referring to FIG. 2, one of the propulsors 12 is shown in more detail. The propulsor 12 comprises a fan 14 housed within a nacelle 16. The propulsor further comprises an electric machine in the form of a permanent magnet motor 18. The permanent magnet motor 18 is coupled to the fan 14 by a shaft 20, in order to drive the fan to provide propulsive power in operation.

The permanent magnet motor 18 comprises a rotor 22 and a stator 24. The rotor 22 is coupled to the shaft, and rotates in user. The rotor 22 comprises a plurality of permanent magnets 26 mounted on a radially outer surface. The stator 24 comprises a plurality of stator electrical windings 28, which are wound around the stator 24. The windings 28 are electrically coupled to a source of electrical power via a controller 30, which controls electrical current to the stator windings 28. AC electrical power provided to the stator windings 28 during operation produces a magnetic field, which interacts with the magnetic field of the permanent magnets 26 to produce a torque, which causes the motor rotor 22, shaft 20 and fan 14 to rotate.

The shaft fan 14, shaft 20 and motor rotor 22 together form rotating machinery, which rotates about a rotational axis 32. It will be understood that, in practice, further rotating machinery may be coupled to each of the fan 14, shaft 20 and rotor 22. In use, vibrations in the rotating machinery occur. These vibrations may take different forms, for instance radial vibrations (i.e. oscillatory disturbance of the machinery in a direction normal to the rotational axis 32), axial vibration ((i.e. oscillatory disturbance of the machinery in a direction parallel to the rotational axis 32) and torsional vibration (i.e. oscillatory twisting disturbance of the machinery about the rotational axis 32).

As with any system that experiences vibration, the rotational machinery is capable of being subjected to mechanical resonance in use. As will be understood, mechanical resonance is the tendency of a mechanical system to respond at greater amplitude when the frequency of its speed torque oscillations or the frequency of a driving force matches one of the system's natural frequencies (also called resonance frequency or resonant frequency). Typically, in a propulsion system, there are a number of sources of driving vibrations. One comprises the rotation of the rotating machinery itself. Consequently, there typically exists a "critical speed" at which the driving frequency and torsional natural frequencies match to produce torsional resonance. In complex systems, it will be understood that several resonances may exist; also having torsional, axial and radial vibration coupled each other. Consequently, several critical speeds may also exist. The critical speeds may in practice encompass a range of speeds, with the range of speeds at which resonance occurs and the magnitude of vibrations at that range of speeds being dependent on the Q factor of the system, in addition to the design inner characteristics.

Conventionally, rotating machinery such as aircraft propulsors are operated to avoid operation for prolonged periods at these critical speeds, in view of the damage that may be caused by the high magnitude vibrations. Consequently, conventional control schemes comprise "keep out zones", i.e. speeds which are avoided during operation, with the motor rapidly accelerating or decelerating the machinery to speeds outside of the critical speed range. However, such operation may be limiting, as this in term limits the range of thrusts that can be generated, which complicates aircraft control, limits engine performance, and reduces the life of structural parts. Furthermore, in view of the high inertia of the system, rapid acceleration through these keep out zones may not be possible, and so resonance may be experienced for a period of time, resulting in fatigue loads onto the system rotors and stators.

In the presently described arrangement, the controller 30 acts to control the speed of the motor 18 to operate the rotating machinery to reduce the effects of resonance on the system, and so enable operation at a wider range of speeds, without experiencing excessive vibration.

Figure 3:
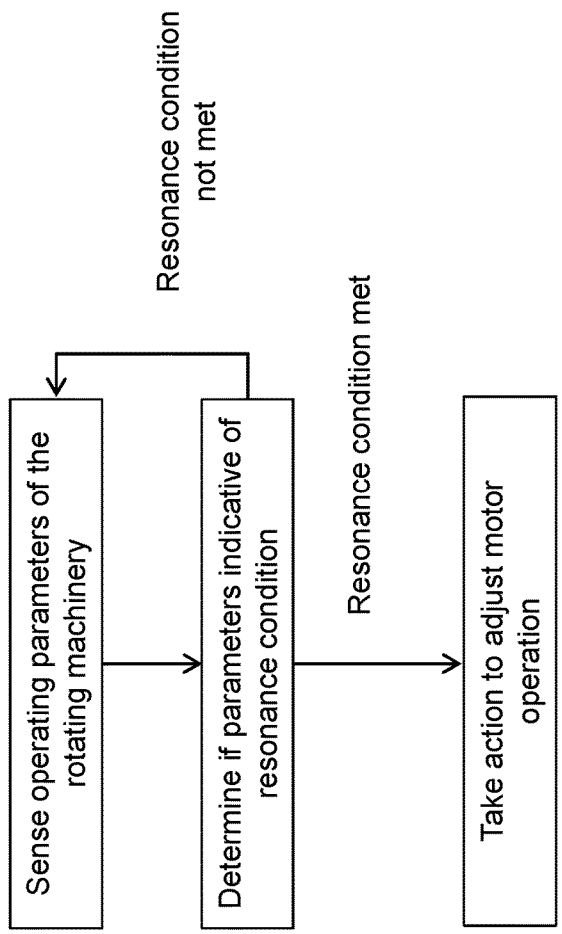
FIG. 3 is a flow diagram of a first control scheme for controlling the propulsor of FIG. 2.

FIG. 3 shows a control scheme for operation by the motor controller 30 for controlling the motor 18. In a first step, one or more parameters of the rotating machinery are sensed, which are input to the motor controller 30. In a second step, the parameters are compared to a lookup table or algorithm, which determines whether the parameters are indicative of an incoming resonance condition, i.e. operation of the rotating machinery in a state where resonance can be expected. Where the lookup table or algorithm indicates that the rotating machinery is, or is about to be, operating in a resonance condition, the controller 30 takes action to adjust motor operation, such that the resonance condition is no longer met, because the natural frequency is altered by means of non-contact stiffness and inertia generated by the electric machine 18.

Figure 4:
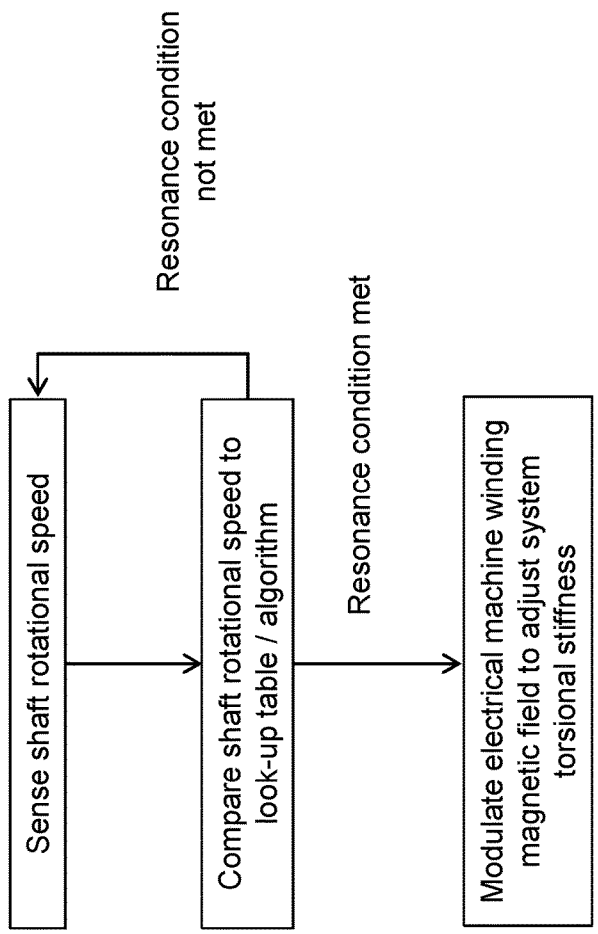
FIG. 4 is a flow diagram of a the first control scheme for controlling the propulsor of FIG. 2 in more detail.
Figure 5:
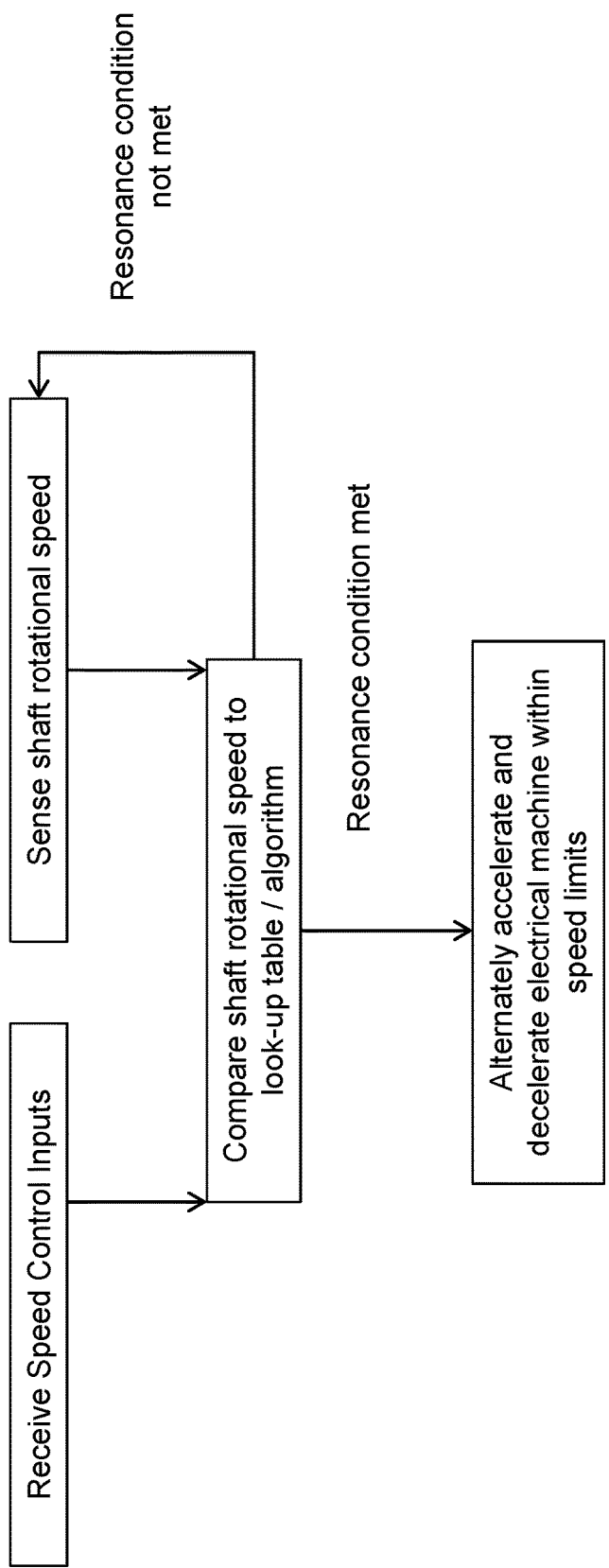
FIG. 5 is a flow diagram of the first control scheme for controlling the propulsor of FIG. 2 in further detail.

In a first embodiment, outlined in FIG. 4, the sensed parameter comprises shaft 20 rotational speed. Consequently, the propulsor 12 comprises a shaft speed sensor 34 coupled to the shaft, which is in signal communication with the controller 30.

In a first step, the shaft rotational speed is sensed by the speed sensor 34, and compared to a look-up table or algorithm stored by the controller 30 in a second step. The lookup table may comprise one or more predetermined critical speeds at which resonance occurs, which may be determined in advance by experimentation, theory or computer modelling, such as Finite Element Modelling (FEM). Additional sensors may be provided to more accurately determine the incoming condition of resonance, for comparison to the sensed speed, the vibration magnitude, and the phase of the shaft vibrational response. For example, one or more temperature sensors (not shown) may be provided, which may be fed into a model to determine the critical speed, since material stiffness (and so resonant frequency) is generally inversely proportional to temperature.

In a third step, where the critical speed and sensed rotational speeds are found to approach and become closer than a defined threshold, action is taken to modify the natural frequency, such that the resonance condition is no longer met. This adaptive method utilises the motor drive controller in order to alter the natural frequencies of the driveline only when a resonance condition is approached. The natural frequency is altered by controlled non-contact springs and non-contact inertia generated and controlled within the electrical machine. This is notably different to conventional methods, in which the actual speed of the system is increased or reduced, such that the speed and critical speed do not match, rather than adjusting the critical speed at which resonance occurs. This is achieved by altering the torsional stiffness of the system.

Figure 6:
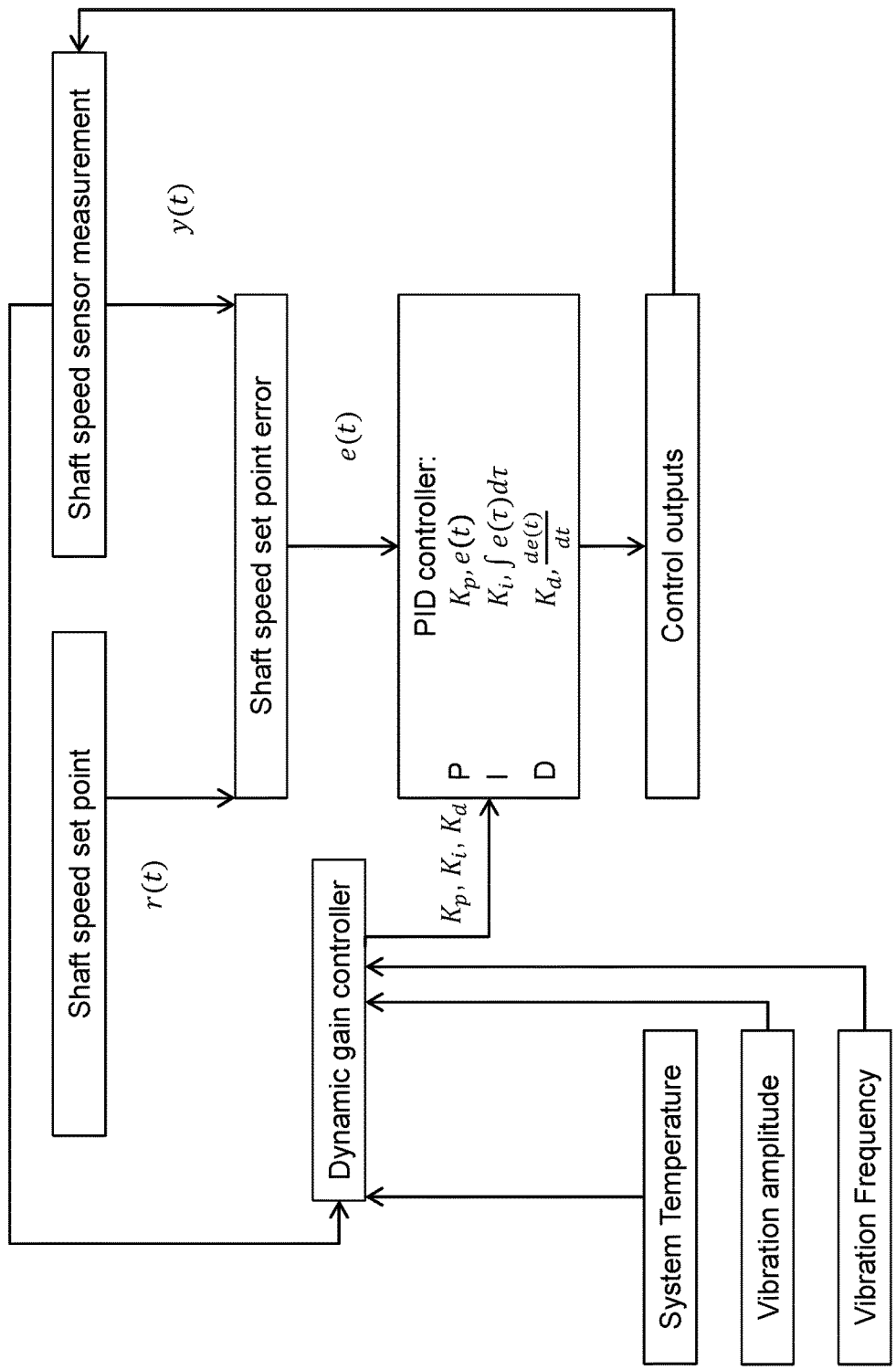
FIG. 6 is a flow diagram of a first implementation of the first control scheme for controlling the propulsor of FIG. 2.
Figure 7:
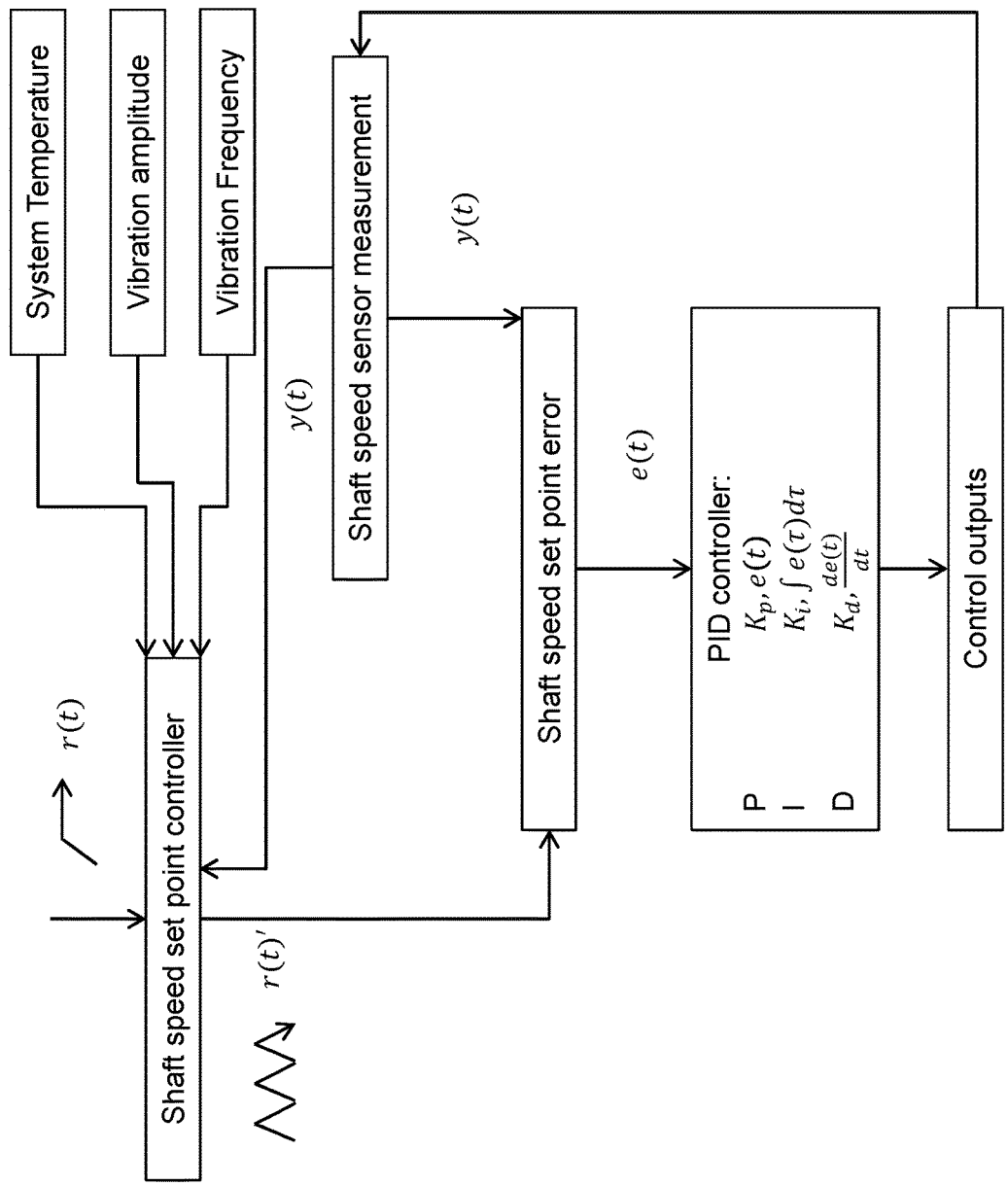
FIG. 7 is a flow diagram of a second implementation of the first control scheme for controlling the propulsor of FIG. 2.

FIG. 6 shows an implementation of the method. In this implementation, the motor is controlled in accordance with a closed loop feedback control system, comprising at least an integral controller, and optionally a Proportional, Integral, Derivative (PID) controller. The PID controller is of a conventional type, and comprises inputs comprising speed sensor inputs, and speed demand inputs. An output in the form of stator coil AC current frequency and magnitudes are provided, which control the motor. Since the output of the circuit affects the input on which the output is determined, the system is said to be "closed loop".

PID controllers are widely known, and can be implemented in either hardware or software, and as either digital or analogue electronic systems. However the controller is implemented, the principle of operation is the same.

The proportional component of the system measures the sensor input y(t) (speed input in this case), and compares this to the current set point input r(t) (the speed set point or maximum or minimum set point in this case). These are subtracted to generate a set point error or delta e(t). The proportional controller then sets the output (motor acceleration) in proportion to the error, multiplied by a proportional gain $K_p$.

In practice, a system controlled only by proportional control will tend to take an infinitely long time to reach the set point. Consequently, in conventional systems, the system is "tuned" to provide a system that achieves the desired set point within an acceptable time frame.

Conventionally, the proportional gain $K_p$ is constant, being set during the design process. However, in this implementation, the conventional proportional component of the PID controller is modified with the addition pf a dynamic gain controller that modifies proportional gain $K_p$ to minimise transient instability. The dynamic gain controller adjusts the proportional gain $K_p$ in accordance with the sensed speed and the incoming sensed resonance parameters, and a corresponding gain $K_p$ is generated by a lookup table or algorithm. In general, the look-up table or algorithm has a different predetermined proportional gain $K_p$ value for the critical speeds, compared to the non-critical speeds. It should be noted that the method of this implementation is preferably based on the modification of the parameters before the system enters into a critical speed range. The gain controller may also take into account other sensed parameters, such as measured or inferred temperatures, phases between shaft and vibrations, peak vibration amplitudes and width, and vibration frequencies. The proportional gain value $K_p$ is set such that the speed does not differ from the set point by greater than a predetermined amount, such that the speed is maintained within the predetermined speed range. This may in effect set a minimum gain value, to accommodate transients or requested accelerations, to be defined in combination with the other gains and filters conjoint effect on transients. As the sensed speed approaches a critical speed, the proportional gain $K_p$ may be increased or reduced. This has the effect of providing additional damping to the system, thereby decreasing the magnitude of torsional and axial vibrations of the system.

Consequently, by modulating the proportional gain $K_p$, the magnitude of vibrations is normally reduced; within the scope of the present disclosure, this sensitivity is used in order to ensure stability containing the magnitude of speed and torque transient response that is caused by a modification in the gain setting triggered by the early indicator sensors.

The PID Integral and Derivative controllers may also be provided with dynamic gain controllers.

Integral control is generally provided to take into account the time over which the error between the set point r(t) and the sensed speed y(t) has persisted. In this case, the integral controller modulates the control output in proportion to the accumulating error over time. The longer the error persists, the greater the integral term becomes, until the error is eliminated, or reverses sign.

In practice, due to inertia in the controlled system, and the increasing integral term over time, a system controlled only by integral control will tend to "overshoot" the target set point, before oscillating back and forth around the set point. Conventionally, the integral gain $K_i$ is adjusted during design to minimise this behaviour, since this is regarded as undesirable.

However, in the present control method, such "overshooting" or "hunting" behaviour may be desirable when modifying the other gains, since this results in alternating acceleration and deceleration of the motor 18 due to the increasing and decreasing torque demand, and so results in increased stiffness of the system. Consequently, by modifying the integral gain $K_i$ and controlling the phase between the torsional deformation, stiffness can be controlled.

Consequently, in this implementation, the conventional integral component of the PID controller is augmented with a dynamic integral gain controller. The dynamic integral gain controller adjusts the integral gain $K_i$ in accordance with the sensed speed, and a corresponding gain $K_i$ is generated by a lookup table or algorithm. In general, the look-up table or algorithm has a different predetermined integral gain $K_i$ value for the critical speeds, compared to the non-critical speeds. Again, the integral gain controller optionally also receives inputs from temperature and vibration sensors, such that the integral gain value $K_i$ may also be adapted on the basis of one or more of temperature, vibration phase, vibration magnitude, and vibration frequency. For example, where the vibration frequency is found to be at a known resonant frequency, the integral gain value may be increased or reduced to modulate the system stiffness. Similarly, increased vibration magnitude may indicate a resonance condition, and so the integral gain can again be modulated to reduce the vibrations. Similarly, temperature can be used to adjust the dynamic control, since resonant frequencies have a known dependence on temperature. Consequently, the look-up table/algorithm/model of the gain controller may include a temperature term.

The integral gain value $K_i$ is set such that the speed does not differ from the set point by greater than a predetermined amount, such that the speed is maintained within the predetermined speed range. This may in effect set a maximum integral gain $K_i$ value, to prevent excessive overshoots. As the sensed speed approaches a critical speed, the integral gain $K_i$ is increased or reduced. This has the effect of providing additional or reduced stiffness to the system, thereby changing the critical speed, while the current speed remains at the set point. Consequently, by modulating the integral gain $K_i$, the critical speed is moved away from the current speed, and the magnitude of vibrations is reduced.

An increase in the gain parameter $K_i$, proportional to alternate angular displacement of the shaft, will increase the non-contact stiffness provided by the rotational machinery and consequently alter the natural frequency. The coefficient of sensitivity achieved by FEM simulations will target an increase in the resonant frequency, thereby increasing the critical speed. Conversely, reducing the stiffness of the rotational machinery will reduce the resonant frequency, thereby reducing the critical speed. In either case, the critical speed of the rotating machinery is moved away from the current operational speed, without requiring the operating speed itself to change. This in turn allows for operation of the rotating machinery at a greater range of operating speeds, without a requirement for "keep out zones". The inventors are aware that the transient stability of the system is of paramount importance in order to ensure that the time characteristic of the dynamic system response is maintained within the stress and clearances safety limits and that the stability of the applied torque is ensured along the whole driveshaft.

Derivative control is generally provided to take into account the rate at which the error between the set point r(t) and the sensed speed y(t) is changing (i.e. the first derivative of the error e(t) with respect to time), which is multiplied with a derivative gain $K_d$ to output a derivative term. In this case, the derivative controller modulates the control output in proportion to the first derivative of the error with respect to time. Consequently, the derivative term reduces the impact of the integral term, and so acts analogously to inertia in a mechanical system.

Again, dynamic control of the derivative term can be used in the present method to control mechanical resonance. Consequently, in this implementation, the conventional derivative component of the PID controller is augmented with a dynamic derivative gain controller. The dynamic derivative gain controller adjusts the derivative gain $K_d$ in accordance with the sensed speed, and a corresponding derivative gain $K_d$ is generated by a lookup table or algorithm. In general, the look-up table or algorithm has a different predetermined derivative gain $K_d$ value for the critical speeds, compared to the non-critical speeds. The derivative gain value $K_d$ is set such that the speed does not differ from the set point by greater than a predetermined amount, such that the speed is maintained within the predetermined speed range. As the sensed speed approaches a critical speed, the derivative gain $K_d$ is increased or reduced. This may be necessary, since the integral gain $K_d$ has been increased or decreased, and so the derivative gain $K_d$ may also need to be adjusted to maintain appropriate system behaviour.

Figure 8B:
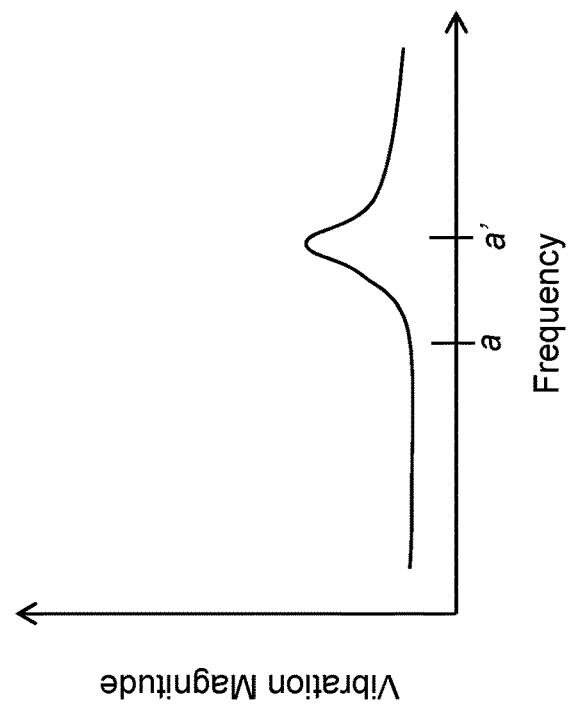
FIGS. 8a and 8b are graphs showing vibration relative to shaft rotational speed before and after the control scheme of FIGS. 3 to 7 is applied.
Figure 8A:
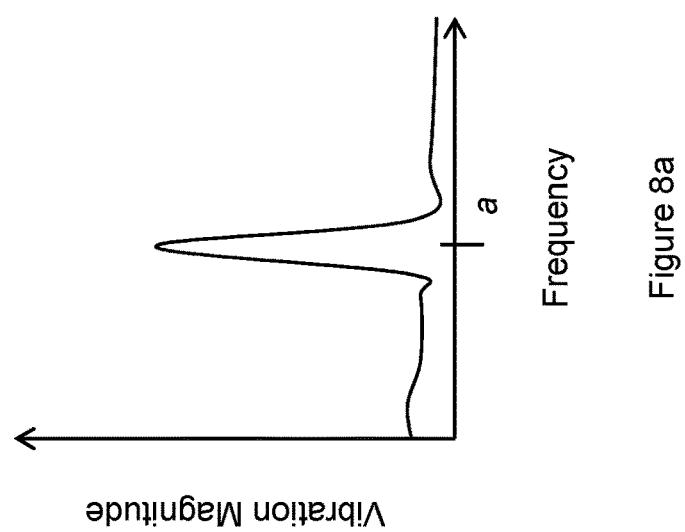

FIGS. 8a and 8b show the impact of the method on the system vibratory response. FIG. 8a shows a typically system vibratory response of a rotating machinery such as the propulsor 12. As can be seen, a resonance condition occurs at a resonant frequency a, whereupon the magnitude of the vibration increases dramatically where a driving frequency corresponds to the resonant frequency. Conventionally, if the propulsor 12 were to be operated such that the motor provides an input driving frequency that corresponds to this resonant frequency, resonance would occur, and excessive vibration would be experienced.

FIG. 8b shows the same propulsor 12, operated in accordance with the present method. As can be seen, the resonant frequency has been shifted to a different frequency a', by modulating the torsional stiffness provided by the motor 18. The motor 18 can now be operated at this speed, without encountering resonance. It can also be seen that the peak vibration magnitude at the resonance frequency has also been reduced, and the "width" of the peak has been increased, in view of additional damping introduced by the method. Consequently, even if the driving frequency were to be rapidly increased to the resonant frequency, or the resonant frequency were to drop, the vibration would still be limited.

Figure 9:
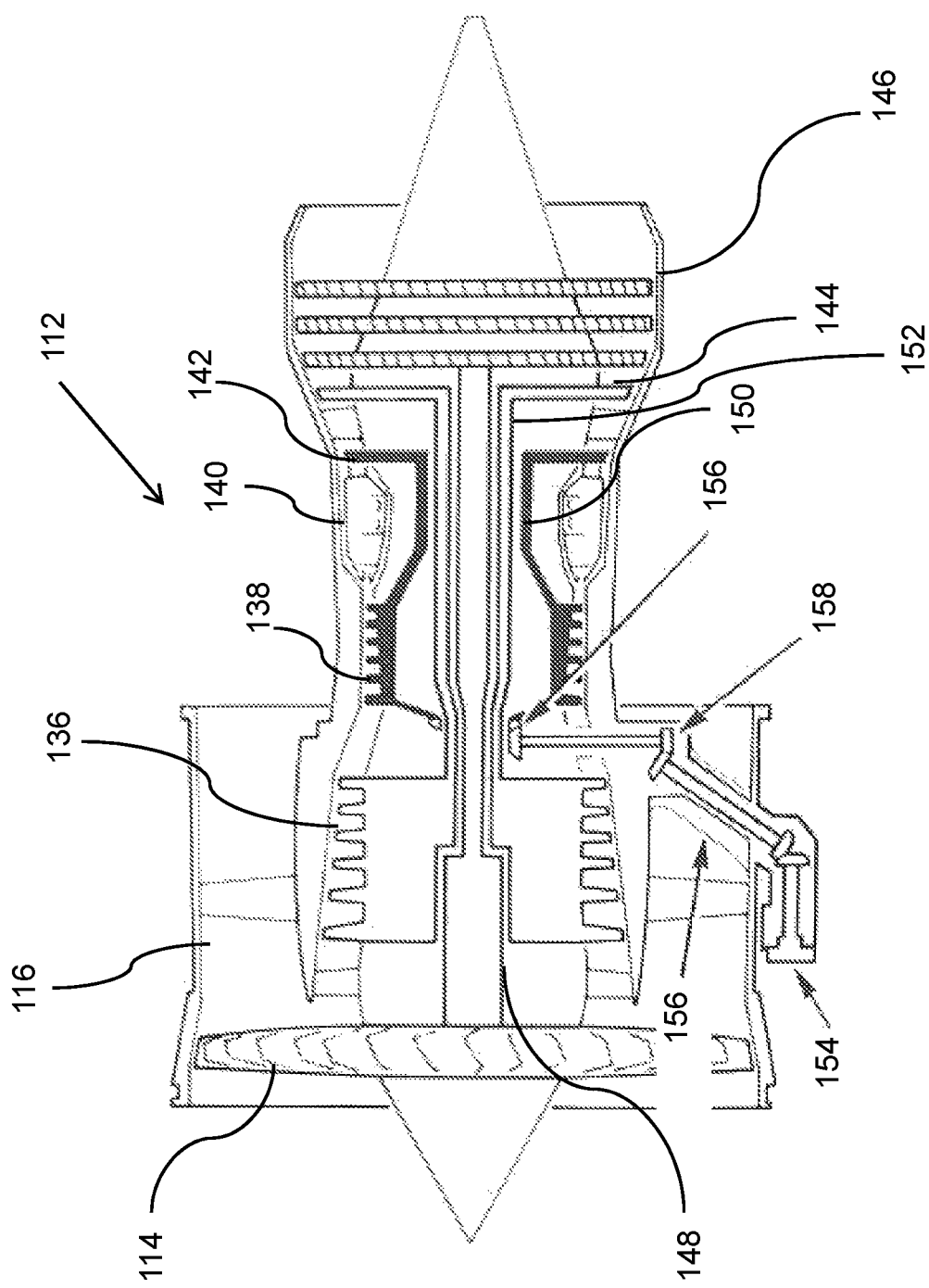
FIG. 9 is a schematic side view of a gas turbine engine for use with the aircraft of FIG. 1, having an electric machine.

FIG. 9 illustrates an alternative application for the method of the present disclosure. FIG. 9 shows a gas turbine engine 112. The gas turbine engine comprises a fan 114 housed within a nacelle 116. The fan 114 is driven by an engine core comprising, a fluid flow series, an intermediate compressor 136, a pressure compressor 138, a combustor 140, and high, intermediate and low pressure turbines 142, 144, 146.

The fan 114 and low pressure turbine 146 are coupled by a low pressure shaft 148, while the intermediate pressure compressor 136 and intermediate pressure turbine 144, and the high pressure compressor 138 and high pressure turbine 142 are coupled by an intermediate pressure shaft 150 and high pressure shaft 152 respectively.

An accessory drive is coupled to the low pressure shaft 148 via one or more offtake shafts 156 and bevel drives 158. The accessory drive comprises, inter alia, an electric machine 154 which typically acts as at least a generator to provide electrical power in operation, and optionally also operates as a starter motor, to start the engine 112.

As will be understood, the gas turbine engine 112 and electric machine 154 represent rotating machinery, which will experience vibration in use. The electric machine 154 can be used to control this vibration, by shifting the resonance frequency of the electric machine 154 and components coupled thereto, such as the offtake shaft 156 and bevel drives 158, as well as the low pressure spool comprising the fan 114, low pressure shaft 148 and low pressure turbine 146. Further electric machines could be provided, which could be coupled to the intermediate and high pressure shafts 150, 152, and could provide control of vibration of those shafts also.

Figure 10:
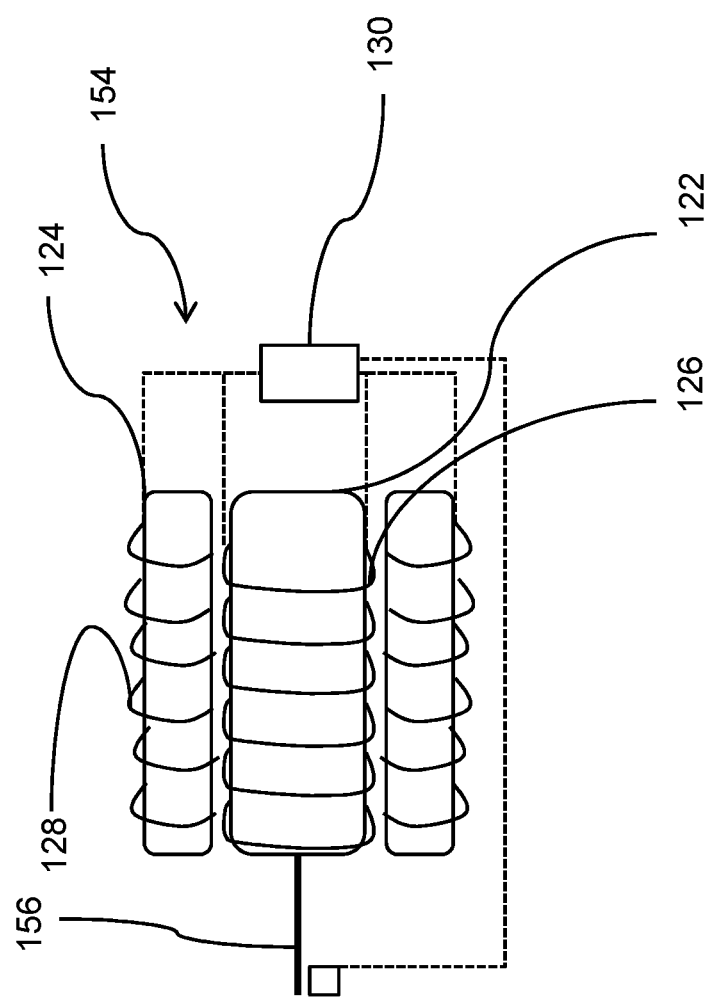
FIG. 10 is a schematic view of an electric machine of the gas turbine engine of FIG. 9.

The electric machine comprises a wound field generator, shown in FIG. 10. The wound field generator 154 comprises a stator 124 comprising a plurality of stator windings 128. The machine further comprises a rotor 122, which differs from the rotor 22 of the machine 18, in that it comprises rotor windings 126 in place of the permanent magnets 26, which are typically fed with DC current. When operating as a generator, the electric machine 154 is controlled by a controller 130 which operates in accordance with a control scheme control the magnetic field applied by one or both of the windings 126, 128.

The control scheme used by the controller 130 is essentially that of FIG. 3, i.e. the shaft rotational speed and/or other parameters are measured and compared to a lookup table or model, and, where a resonance condition is found to be met, the controller modulates strength of either of the machine windings 126, 128 to modulate the stiffness provided by the electric machine 154.

Figure 11:
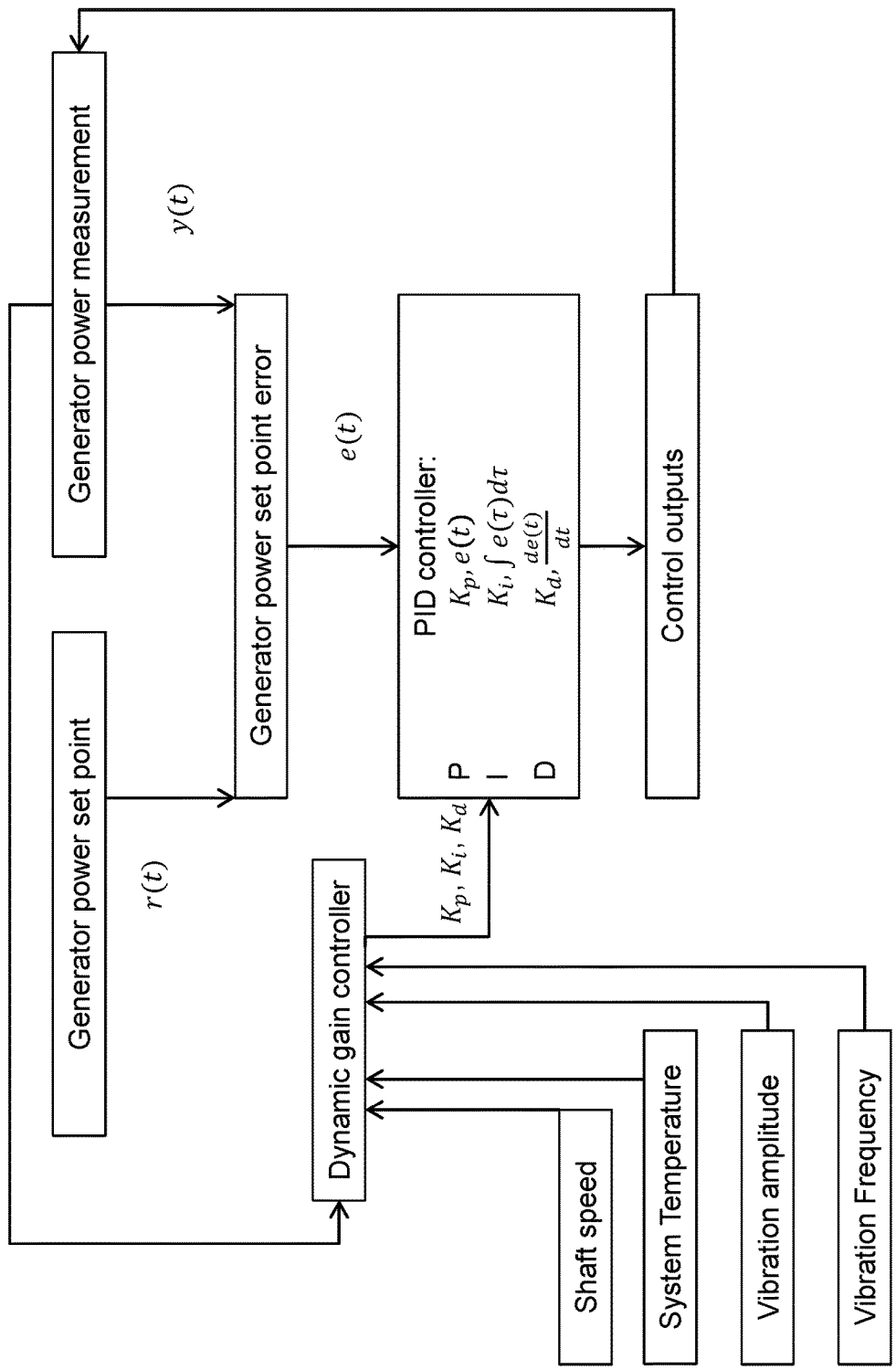
FIG. 11 is a flow diagram illustrating a first method of controlling the electric machine of FIG. 10.
Figure 12:
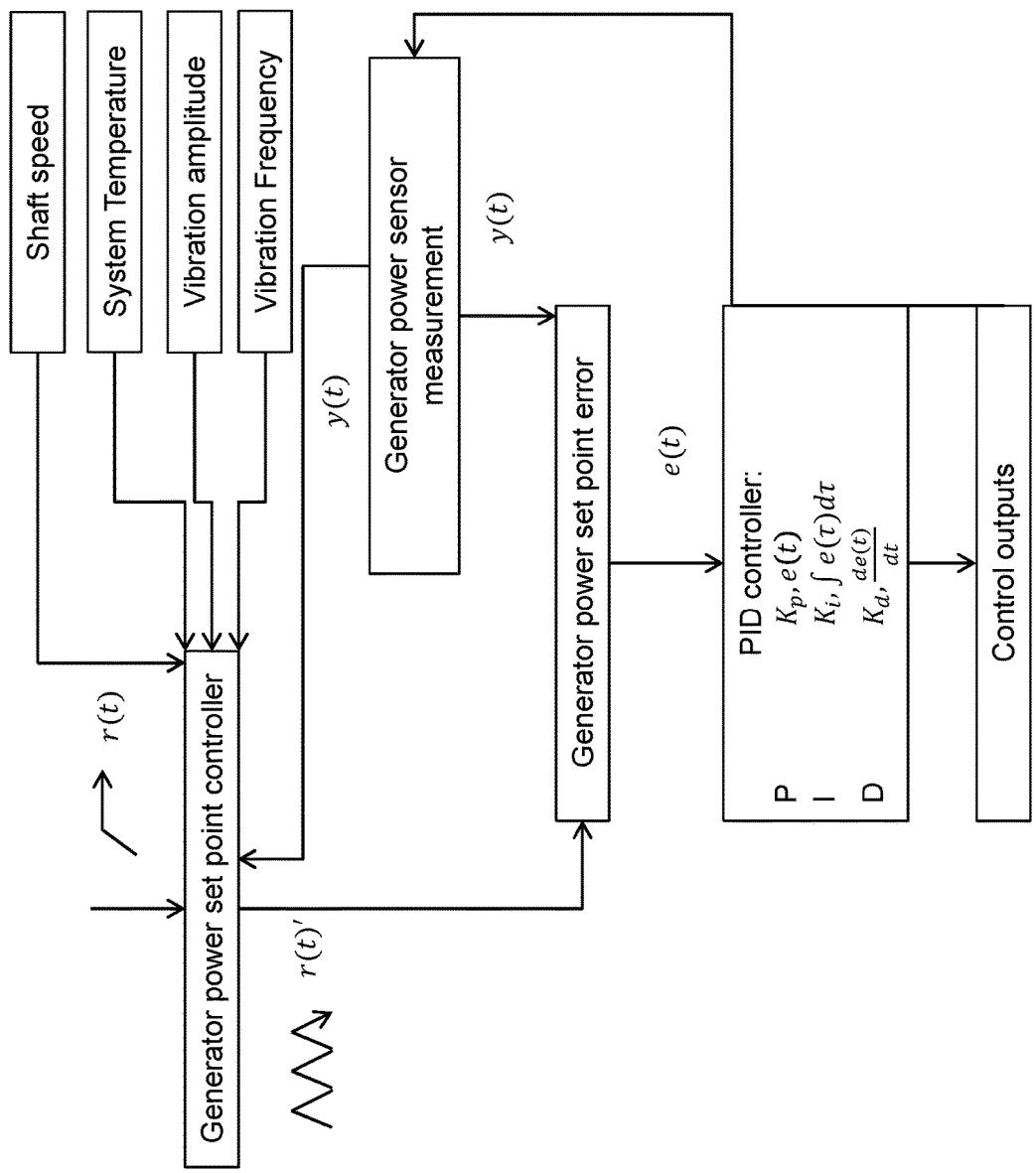
FIG. 12 is a flow diagram illustrating a second method of controlling the electric machine of FIG. 10.

FIG. 11 gives an example control scheme in more detail. In this example, the electric machine 154 is controlled by controlling the strength of the magnetic field generated by the rotor windings 126. By increasing the rotor winding field strength 126, the torque absorbed by the machine 154 will increase, therefore increasing the stiffness of the system. It is of course important to maintain the power produced by the generator 154 substantially constant over a period of time, and so the machine 154 is controlled in accordance with a generator power set point, and the rotor winding 126 field strength is oscillated up and down to increase and reduce the torque, while maintaining the power produce by the machine at the set point during operation. Again, this can be achieved by modulating the proportional, integral and derivative gains using a dynamic gain controller on the basis of a sensed parameter such as shaft speed, system temperature, vibration amplitude and vibration frequency (as shown in FIG. 11), or controlling the set point directly on the basis of these sensed parameters using a set point controller (as shown in FIG. 12).

Advantageously, the invention provides for control of system resonances, to reduce machine vibration in use. In practical terms, this may result in the reduction or elimination of "keep out zones", which may result in increased operational flexibility.

Accordingly, the disclosed method provides an adaptive and highly controlled change in the non-contact stiffness and non-contact inertia properties of the rotating machinery, in order to vary a natural frequency of the system sufficiently before an incoming resonance is excited by the speed related driving forces. Once the source of excitation due to the shaft frequency has passed the critical speed range, the control system returns to the nominal condition.

Advantageously, the electrical drive can provide additional non-contact stiffness and non-contact inertia in a controlled manner that can be operated in order to opportunely modify the system natural frequencies, to prevent resonances from occurring.

Other gas turbine engines to which the present disclosure may be applied may have alternative configurations. By way of example such engines may have an alternative number of interconnecting shafts (e.g. three) and/or an alternative number of compressors and/or turbines. Further the engine may comprise a gearbox provided in the drive train from a turbine to a compressor and/or fan.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

For example, it will be understood that the system could be applied to machines other than gas turbine engines. Similarly, it will be understood that the invention could be applied to other electric machine types, such as induction machines, acting as either motors or generators, and could be applied to axial flux electric machines as well as radial flux electric machines. The generator control scheme could be applied to a permanent magnet generator (with the controller controlling stator winding current).

The invention claimed is:

1. A method of control of an electric machine coupled to rotating machinery, the electric machine comprising a rotor and a stator, wherein the method comprises:
   sensing one or more parameters indicative of one or more resonance conditions of the rotating machinery;
   comparing the sensed parameter to a predetermined threshold to determine whether the rotating machinery is operating at the resonance condition; and
   where the rotating machinery is determined to be operating at the resonance condition, adjusting a magnetic field of one or both of the rotor and the stator to provide a predetermined torque to the rotating machine, to modulate the stiffness of the rotational machinery, and thereby move the resonance condition away from the current rotating machinery conditions.

2. A method according to claim 1, wherein the sensed parameter comprises one or more of rotating machinery rotational speed, rotational machinery temperature, rotational machinery vibrational modes, rotational machinery vibrational frequency, and rotational machinery vibrational magnitude.

3. A method according to claim 2, wherein where the sensed parameter comprises the rotating machinery rotational speed, the resonance condition comprises a predetermined rotating machinery critical speed.

4. A method according to claim 1, wherein the magnetic field of one or both of the rotor and the stator is modulated by cyclically increasing and reducing the torque applied by the electric machine within a predetermined speed band to adjust the stiffness of the system, such that rotating machinery is no longer operated at the resonance condition.

5. A method according to claim 1, wherein where the electric machine comprises a motor, the method comprises modulating the electric current supplied to one or more machine windings, to modulate the electric machine torque.

6. A method according to claim 1, wherein where the electric machine comprises a generator, the method may comprise modulating the electrical load on one or more machine windings to modulate the electric machine torque.

7. A method according to claim 1, wherein the electrical machine comprises one or more of a permanent magnet synchronous machine, a wound field machine, a brushed DC machine, and an induction machine.

8. A method according to claim 1, using one or more of proportional, integral and derivative control to control the magnetic field of the electric machine.

9. A method according to claim 8, comprising modulating one or more of proportional, integral and derivative gain values to adjust one or more of the stiffness, inertia, and damping of the electric machine.

10. A method according to claim 9, wherein one or more predetermined gain value is determined in accordance with one or more of model based control, closed loop control, and open loop control.

11. A method according to claim 10, wherein the closed loop control comprises determining the one or more gain value on the basis of the sensed parameter of the rotating machinery.

12. A method according to claim 1, comprising setting one or more of a predetermined target torque oscillation frequency, torque magnitude and speed range at a corresponding sensed parameter, and controlling the electrical machine torque in accordance with the predetermined target torque oscillation frequency, torque magnitude and/or speed range at the corresponding sensed parameter.

13. A system comprising rotating machinery and an electric machine coupled to the rotating machinery, the electric machine comprising a rotor and a stator, the system further comprising a controller adapted to control the electric machine in accordance with the method of claim 1.

14. A system according to claim 13 comprising an aircraft propulsor, wherein the rotating machinery comprises one or more engine shafts and one or more propulsive fans or propellers.

15. A system according to claim 14, wherein the aircraft propulsive system comprises a gas turbine engine comprising at least one compressor and at least one turbine interconnected by a main engine shaft, wherein the electric machine is coupled to the main engine shaft.

* * * * *